United States Patent
Baker

(10) Patent No.: US 6,674,737 B1
(45) Date of Patent: Jan. 6, 2004

(54) WIRELESS LOCAL AREA NETWORK(LAN) AND A METHOD OF OPERATING THE LAN

(75) Inventor: Matthew P. J. Baker, Canterbury (GB)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/481,773

(22) Filed: Jan. 11, 2000

(30) Foreign Application Priority Data

Jan. 13, 1999 (GB) .............................................. 9900593

(51) Int. Cl.$^7$ ........................... H04Q 7/24; H04L 12/66
(52) U.S. Cl. ........................ 370/338; 370/349; 370/352
(58) Field of Search ................................ 370/254, 315, 370/316, 321, 324, 326, 329, 337, 338, 335, 349, 449, 453, 454, 474, 501, 352, 392; 455/11.1, 421, 450, 509, 516, 520

(56) References Cited

U.S. PATENT DOCUMENTS

| | | | |
|---|---|---|---|
| 4,713,809 A | * 12/1987 | Mizota | 370/315 |
| 5,481,539 A | * 1/1996 | Hershey et al. | 370/312 |
| 5,761,194 A | * 6/1998 | Bahlenberg | 370/315 |
| 6,128,318 A | * 10/2000 | Sato | 370/503 |
| 6,132,306 A | * 10/2000 | Trompower | 455/11.1 |
| 6,144,653 A | * 11/2000 | Persson et al. | 370/337 |

FOREIGN PATENT DOCUMENTS

EP        210-811 A   *  2/1987

* cited by examiner

*Primary Examiner*—Chi Pham
*Assistant Examiner*—Afsar M. Qureshi

(57) ABSTRACT

A wireless local area network (LAN) comprises a primary station (PS) having a radio transceiver unit and a plurality of secondary stations (SS). Each secondary radio station having its own transceiver unit. The primary station operates in accordance with a time division protocol having a plurality of concatenated frames. A predetermined number of the concatenated frames comprise a superframe which further includes a time slot (HiRBS). In response to the transmission of a system wide clock cycle synchronization signal the primary station initiates the transmission of a superframe and a secondary station (HN) out of range from the primary station and wishing to join the LAN but unable to communicate directly with the primary station transmits a signal burst in the time slot for reception by a secondary station (FN) which is in range of the primary station, the secondary station (FN). The secondary station (FN) acts as a relay station for the out-of-range secondary station(HN) during its registration with the LAN. The time slot (HiRBS) may be located in from of the first frame or within the first frame of the superframe.

7 Claims, 3 Drawing Sheets

WIRELESS LOCAL AREA NETWORK(LAN) AND A METHOD OF OPERATING THE LAN

BACKGROUND OF THE INVENTION

1. Field of the Invention

The present invention relates to a wireless local area network(LAN) and to a method of operating the LAN. The LAN may be of any suitable type having particular, but not exclusive, application in short range applications such as may be found in domestic and office environments.

2. Description of the Related Art

A typical LAN may comprise central controller consisting of a controller and a primary station having radio transceiving means, the transmitting range of the primary station defining the radio coverage area of the LAN, and a plurality of secondary stations located in the coverage area and registered with central controller. Each secondary station comprises a radio transceiver. Communication between the primary station and the secondary stations in the LAN is done on a time division duplex basis. However provision is made in the time division protocol for duplex transmission between secondary stations without having to use the primary station. Depending on the environment there may be 2 or more LANs with overlapping coverage areas and also it is possible for a secondary station to be able to roam and to want to seek registration with a LAN although out-of-range with the primary station of that LAN. However because the roaming secondary station is out-of-range it is unable to receive the downlink transmissions from the primary station and in consequence it is unable to determine the framing structure of these transmissions.

SUMMARY OF THE INVENTION

An object of the present invention is to enable an out-of-range secondary station to register with the central controller of a LAN it wishes to join.

According to one aspect of the present invention there is provided a method of operating a local area network(LAN) comprising a primary station having a radio transceiving means and a plurality of secondary stations, each secondary station having radio transceiving means, characterised by periodically transmitting wide area control signals, by the primary station initiating transmission of a signal a time interval after the wide area control signal, and by a secondary station which is out-of-range with the primary station and wishing to join the LAN transmitting a signal burst in said predetermined interval.

The present invention provides a method of operating a local area network(LAN) comprising a primary station having a radio transceiving means and a plurality of secondary stations, each having radio transceiving means, characterised in that the primary station operates in accordance with a time division protocol comprising a plurality of concatenated frames, in that a predetermined number of the concatenated frames comprise a superframe, in that a wide area control signal is transmitted, in that a predetermined interval after the wide area control signal the primary station initiates the transmission of a superframe, and in that a secondary station unable to communicate directly with the primary station transmits a signal burst during at least a portion of the predetermined interval for reception by at least one of the secondary stations which is in range of the primary station, said at least one of the secondary stations acting as a relay station for the said secondary station.

The present invention also provides a method of operating a local area network (LAN) comprising a primary station having a radio transceiving means and a plurality of secondary stations, each secondary station having radio transceiving means, characterised by periodically transmitting wide area control signals, by the primary station initiating transmission of a signal after the wide area control signal, the signal comprising a superframe consisting of a plurality of TDMA frames together with a time slot, and a secondary station which is out-of-range with the primary station and wishing to join the LAN transmitting a signal burst in said time slot.

The present invention further provides a method of operating a local area network(LAN) comprising a primary station having a radio transceiving means and a plurality of secondary stations, each secondary station having radio transceiving means, characterised in that the primary station operates in accordance with a time division protocol comprising a plurality of concatenated frames, in that a predetermined number of the concatenated frames comprise a superframe which further includes a time slot, in that a wide area control signal is transmitted, and in that the primary station initiates the transmission of a superframe, wherein a secondary station wishing to join the LAN but unable to communicate directly with the primary station transmits a signal burst in said time slot for reception by at least one of the secondary stations which is in range of the primary station, said at least one of the secondary stations acting as a relay station for the said secondary station.

According to a second aspect of the present invention there is provided a local area network(LAN) comprising a central controller including a primary station having radio transceiving means, a plurality of secondary stations, each secondary station having radio transceiving means, means for transmitting a wide area control signal, the primary station responsive to receipt of the wide area control signal transmitting a message comprising a time slot concatenated with a plurality of frames, said time slot enabling a secondary station which is out of range of the primary station to transmit a signal burst.

By means of the present invention the out-of-range secondary station is able to be synchronised with the stations of the LAN and be able to register with the central controller of the LAN using an already registered secondary station as a relay station.

BRIEF DESCRIPTION OF THE DRAWINGS

The present invention will now be described, by way of example, with reference to the accompanying drawings, wherein:

In the drawings the same reference numerals have been used to identify corresponding features.

Referring to FIG. 1, three LANs, LAN 1, LAN 2 and LAN 3, are shown. Each LAN comprises a central controller CC formed by a primary station PS consisting of radio transceiving means and an associated controller CON. The geographical extent of the LAN is determined by the radio coverage area of the transmitter of the primary station PS. Within the coverage area are located secondary stations SS which comprise transceiving means, a controller and an end user apparatus which in a domestic environment may for example be a TV, VCR or a personal computer. The output power of the secondary station's transmitter is comparable with that of the primary station so that a secondary station can communicate from wherever it is within the LAN.

In operation each primary station PS may operate on a different frequency or may operate at different times on the same frequency so that there is no interference between adjacent LANs. Communication between a primary station PS and its secondary stations is in accordance with a time division protocol based on a sequence of concatenated frames termed a superframe. FIG. 2 shows two typical frames F1, F2 which comprise three main fields BCH, RACH and OD(other data). The field BCH comprises a base station channel consisting of synchronising signals and other timing information which a secondary station requires to determine the location of the RACH field which may be of variable length. The RACH field constitutes a random access channel and fulfils three main functions: (a) downlink transmissions such as an ALOHA message or responses to ALOHA messages, (b) uplink transmissions from secondary stations such as an ALOHA message or responses to the ALOHA message and establishing uplink communication links, and (c) secondary station to secondary station communications within the LAN. The field OD relates to the exchange of data. If a secondary station registered with a central controller switches-on it has to receive the BCH field in order to synchronise itself and to determine the location of the RACH field. Once synchronised then it is able to receive the RACH field and participate in the various modes of operation mentioned above.

DETAILED DESCRIPTION OF THE INVENTION

Figure 1:
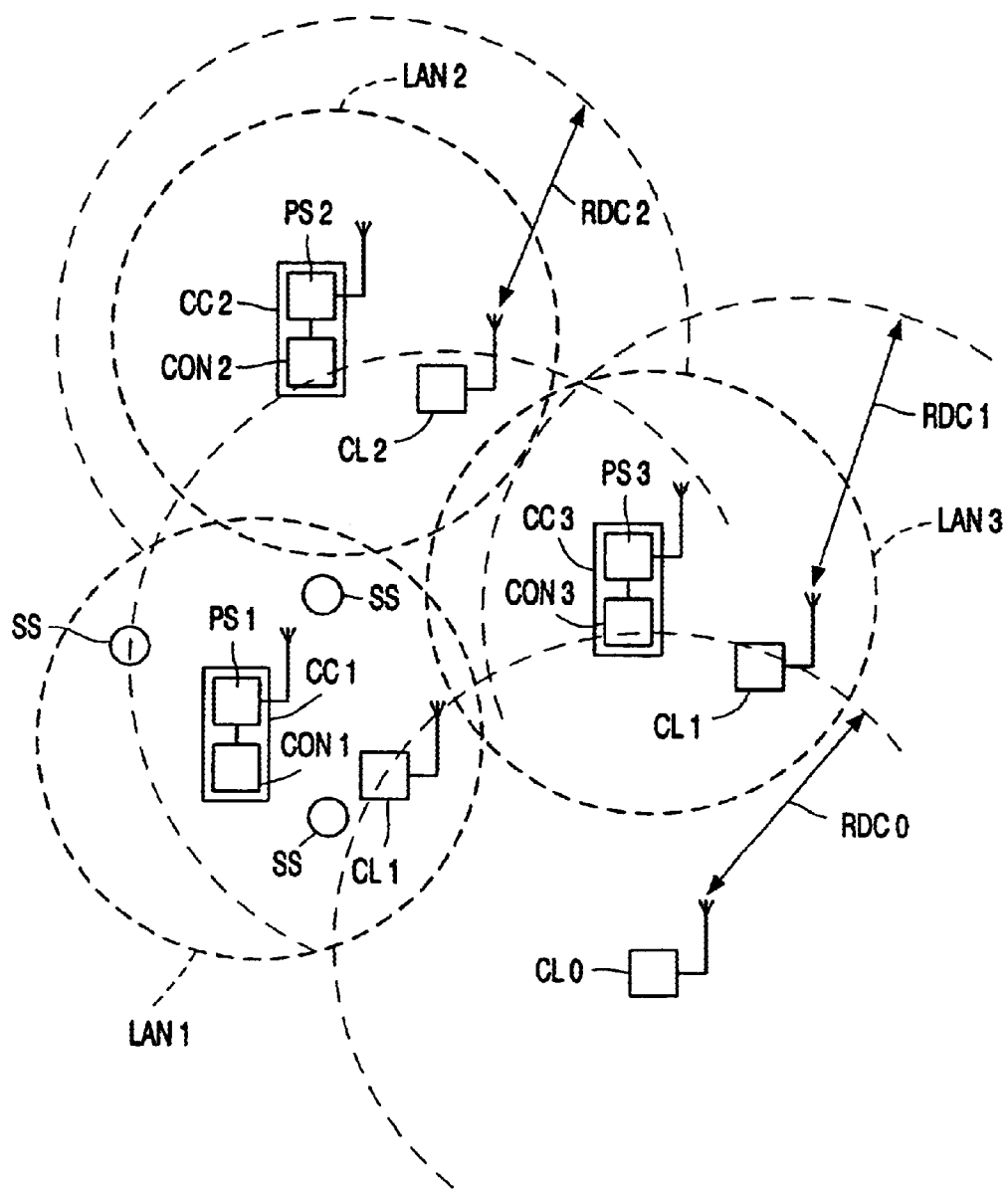
FIG. 1 is a diagram of 3 overlapping LANs and a plurality of transmitters for propagating clock synchronisation signals.

Reverting to FIG. 1, there is shown one method of propagating a wide area control message, such as a clock cycle synchronisation area, over a large geographical area encompassing a plurality of LANs. The basic principle is based on a master clock CLO transmitting a clock signal. This signal is received by a first group of clock transceivers CL1 which are arranged to re-transmit the clock signals at a known time interval T after the master clock CLO transmitted the original signal. A second group of clock transceivers CL2 receive the clock signal from the first group and re-transmit the clock signal at the same known interval T after the first group CL1 transmitted its clock signal. The sequence is repeated by the third and subsequent groups as required. The total time between each re-transmission, termed radio distance class RDC, comprises the sum of the time to transmit the clock time signal and the known time interval T. Thus by the master clock CLO and each of the groups of clocks CL1, CL2 and so on including their RDC in their transmission or otherwise knowing their RDC, a primary station and a secondary station can determine the start of the master clock transmission and can synchronise its clock accordingly. The transmission of successive clock signals occupies a period of time termed a clock cycle synchronisation area CCSA(see FIG. 4).

Figure 3:
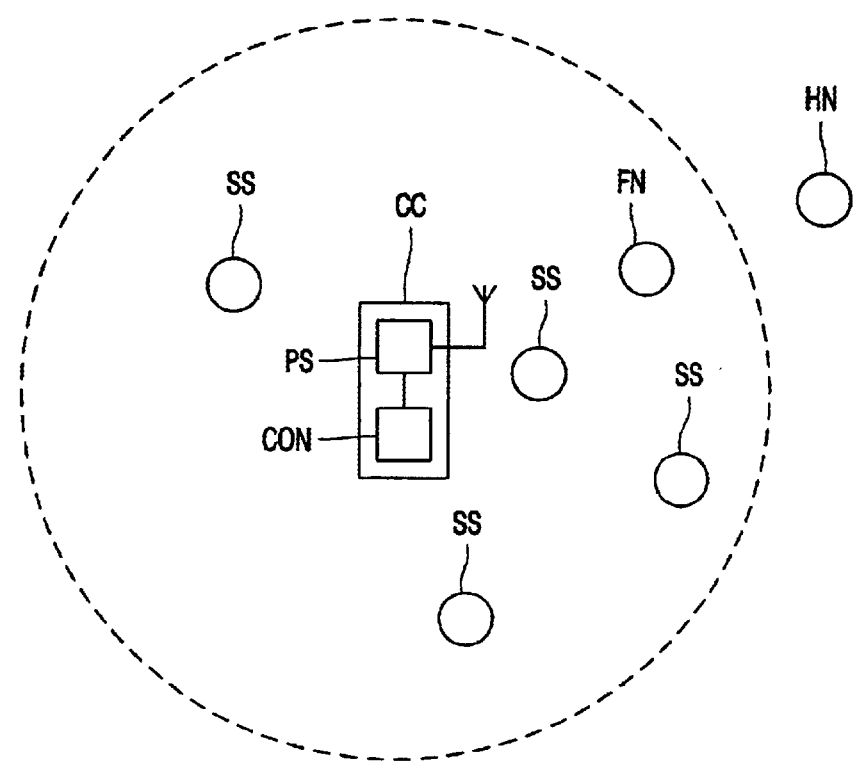
FIG. 3 is a diagram of a single LAN and serves to facilitate an understanding of the method in accordance with the present invention.

Referring to FIG. 3 which shows a single LAN the geographical extent of which is shown by the broken line circle. A secondary station, termed a hidden node HN, is outside the coverage area of the LAN and wishes to register with the central controller CC. However as it is out-of-range of the primary station's transmitter it cannot hear the BCH information which gives the location of the RACH field which is normally used to enable new secondary stations to register in a LAN, consequently it cannot register.

Figure 2:
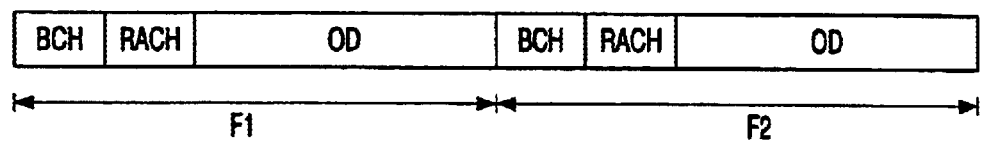
FIG. 2 illustrates a typical frame structure used in a time division protocol for use in a LAN.
Figure 4:
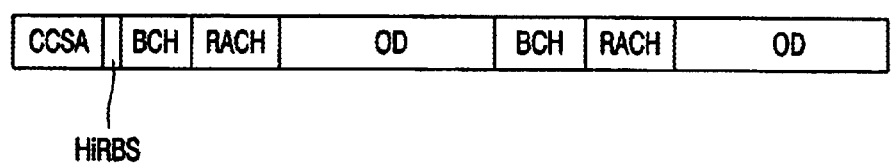
FIG. 4 is a timing diagram illustrating a modified time division protocol.

The method in accordance with the present invention will permit the hidden node HN to join the LAN through the intermediary of an in-range secondary station, termed a forwarding node FN, located within the LAN and therefore is able to receive transmission from its primary station. This can be effected by making use of the clock cycle synchronisation area CCSA or other suitable wide area control message which is transmitted once every superframe, normally at the start of the superframe, and provides a timing reference to all the stations. The timing of the superframe shown in FIG. 2 is modified by adding a time slot (or time interval) in the time domain between the end of the CCSA and the start of the superframe proper. This is shown in FIG. 4 and the additional time slot or time interval is termed a hidden request burst slot HiRBS. The duration of HiRBS is of the order of one symbol.

A new HN wishing to join an existing wireless LAN determines the timing of the HiRBS from the CCSA. The HN sends a 1 symbol burst in the HiRBS. The primary station PC will not receive the HiRBS since HN is out-of-range. However if a forwarding node FN, which is in-range of the primary station PS, hears the HiRBS, it will respond during the RACH period of the respective frame with a RACH_notify message which starts with a predefined identifiable sequence and includes information giving the timing relationship between the RACH and the CCSA. The HN listens for the RACH_notify messages to determine the timing of the RACH so that it can use the RACH for the next stage of registration with the FN. It is possible for several secondary stations to hear the HiRBS message and act as FNs but in the event the HN selects the best FN for establishing its link with the primary station. The HN sends registration information to the selected FN which is forwarded by the FN in the next RACH period to effect registration of HN with the central controller.

Figure 5:
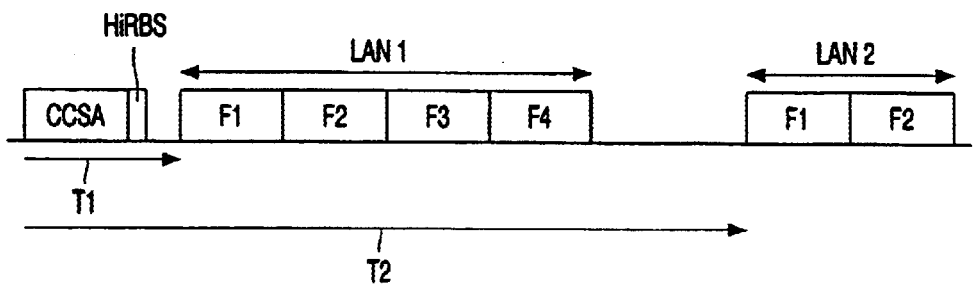
FIG. 5 is a timing diagram illustrating two or more LANs sharing the same channel.

FIG. 5 illustrates an arrangement in which two or more LANs operate on the same frequency channel. The central controllers transmit their respective superframes which may be of unequal length as shown by LAN 1's superframe comprising frames F1 to F4 and LAN 2's superframe comprising frames F1 and F2. The timing of the respective transmissions is related to the commencement of the transmission of the CCSA, for example LAN 1's superframe begins at a predetermined time T1 after the start of the CCSA and LAN 2's superframe begins at a predetermined time T2 after the start of the CCSA. The HiRBS time slot is provided in a common time period, conveniently immediately following the CCSA, to enable any HN to transmit a signal burst which is detected by FN in a nearby LAN. Registration then proceeds as described previously.

Figure 6:
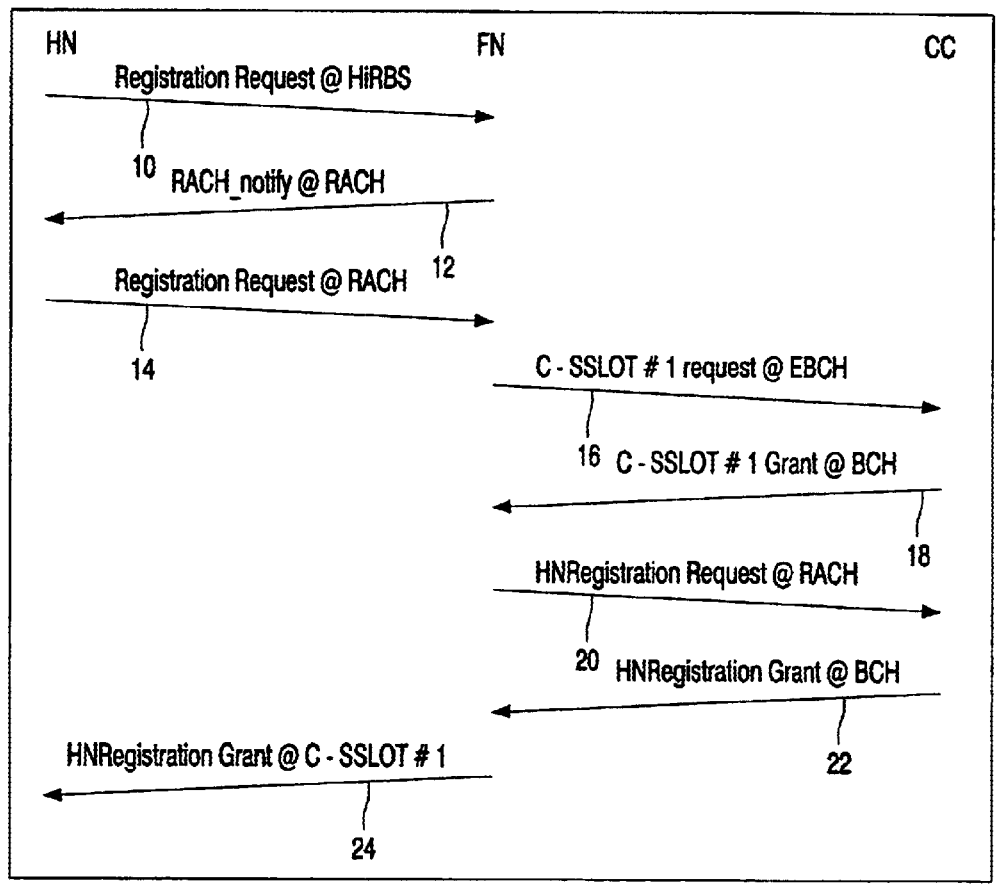
FIG. 6 illustrates the various control messages associated with the registration of a hidden node(HN).

FIG. 6 shows an example of the signalling between the HN, FN and the central controller CC to effect registration of the HN.

The sequence comprises messages 10 to 24 which are summarised below:

| | |
|---|---|
| Message 10 | HN sends HiRBS burst |
| Message 12 | FN sends RACH_notify |
| Message 14 | HN sends registration request in the next RACH |
| Message 16 | FN requests a time slot from the CC |
| Message 18 | CC grants the time slot |
| Message 20 | FN forwards HN's registration request |
| Message 22 | CC grants HN's registration request |
| Message 24 | FN forwards the granted registration request to HN. |

Other signalling by the HN is relayed to and from the CC by the FN.

Although the hidden request burst slot HiRBS has been described as being located at the beginning of the superframe it may be located at another point in the superframe, such as between BCH and RACH of the first frame or at the beginning of the first RACH field, which is at a fixed time interval from the beginning of the CCSA and can be programmed into the secondary stations.

The provision of the HiRBS has the benefit that the minimum of available bandwidth has to be devoted to allowing out-of-range secondary stations (or hidden nodes) to register with a LAN, which bandwidth may not be used if there are no hidden nodes.

From reading the present disclosure, other modifications will be apparent to persons skilled in the art. Such modifications may involve other features which are already known in the design, manufacture and use of wireless local area network and component parts thereof and which may be used instead of or in addition to features already described herein.

What is claimed is:

1. A method of operating a local area network (LAN) comprising a primary station having a radio transceiving means and a plurality of secondary stations, each secondary having radio transceiving means, characterized by periodically transmitting wide area control signals, by the primary station initiating transmission of a signal a predetermined time interval after the wide area control signal, and by a secondary station which is out-of-range of the primary station and wishing to join the LAN transmitting a signal burst in said predetermined time interval;

wherein a LAN registered secondary station of the plurality of secondary stations that is in communication range of both the primary station and said secondary station that is out-of-range from the primary station receives the signal burst and acts as a relay station between the primary station and the out-of-range secondary station by transmitting a (Random Access Channel) RACH_notify message in response to receipt of the signal burst from the out-of-range secondary station, and wherein the out-of-range secondary station listens for and receives the RACH notify message from at least one of the secondary stations to determine timing of the RACH to use the RACH for a subsequent stage of registration with the LAN via the secondary station whose RACH notify message was received to act as the relay station.

2. A method as claimed in claim 1, wherein a plurality of secondary stations in the LAN receive the signal burst from the out-of-range station, and the out-of-range station selects a particular secondary station to act as a relay station.

3. A method of operating a local area network (LAN) comprising a primary station having a radio transceiving means and a plurality of secondary stations, each having radio transceiving means, characterized in that the primary station operates in accordance with a time division protocol comprising a plurality of concatenated frames, in that a predetermined number of the concatenated frames comprise a superframe, in that a wide area control signal is transmitted, in that a predetermined interval after the wide area control signal the primary station initiates the transmission of a superframe, and in that a secondary station unable to communicate directly with the primary station transmits a signal burst during at least a portion of the predetermined interval for reception by at least one of the secondary stations which is in range of the primary station, said at least one of the secondary stations acting as a relay station for the said secondary station by transmitting a (Random Access Channel) RACH notify message in response to the signal burst transmitted by the out-of-range secondary station, and wherein the out-of-range secondary station receives the RACH notify message from one of the secondary stations and determines timing of the RACH to use the RACH for a subsequent stage of registration with the LAN via the secondary station acting as the relay station, wherein said at least one of the secondary stations that acts as a relay being chosen by the out-of-range secondary station.

4. A method of operating a local area network (LAN) comprising a primary station having a radio transceiving means and a plurality of secondary stations, each secondary station having radio transceiving means, characterized by periodically transmitting wide area control signals, by the primary station initiating transmission of a signal after the wide area control signal, the signal comprising a superframe consisting of a plurality of TDMA frames together with a time slot, and a secondary station which is out-of-range with the primary station and wishing to join the LAN transmitting a signal burst in said time slot that is received by one or more secondary stations that are registered with the LAN, with at least one of said one or more secondary stations that are registered with the LAN transmitting a (Random Access Channel) RACH notify message in response to the signal burst transmitted by the out-of-range secondary station, and wherein the out-of-range secondary station receives the RACH notify message from one of the secondary stations and determines timing of the RACH to use the RACH for a subsequent stage of registration with the LAN via the secondary station acting as the relay station.

5. A method as claimed in claim 4, wherein said out-of-range secondary station selects the secondary station to act as a relay station.

6. A method of operating a local area network (LAN) comprising a primary station having a radio transceiving means and a plurality of secondary stations, each secondary station having radio transceiving means, wherein the primary station operates in accordance with a time division protocol comprising a plurality of concatenated frames, in that a predetermined number of the concatenated frames comprise a superframe which further includes a time slot, in that a wide area control signal is transmitted, and in that the primary station initiates the transmission of a superframe, wherein a secondary station wishing to join the LAN but unable to communicate directly with the primary station transmits a signal burst in said time slot for reception by at least one of the secondary stations which is in range of the primary station, said at least one of the secondary stations acting as a relay station for the said secondary station by transmitting a (Random Access Channel) RACH_notify message in response to the signal burst transmitted by the out-of-range secondary station, and wherein the out-of-range secondary station listens for and receives the RACH notify message from at least one of the secondary stations and determines timing of the RACH to use the RACH for a subsequent stage of registration with the LAN via a selected secondary station acting as the relay station.

7. A local area network (LAN) comprising a central controller including a primary station having radio transceiving means, a plurality of secondary stations, each secondary station having radio transceiving means, means for transmitting a wide area control signal, the primary station responsive to receipt of the wide area control signal transmitting a message comprising a time slot concatenated with a plurality of frames, said time slot enabling a secondary station which is out of range of the primary station to transmit a signal burst for receipt by one or more registered secondary stations that are in communication range with the primary station, wherein one of the secondary stations of the LAN acts as a radio relay station for the out-of-range secondary station by transmitting a (Random Access Channel) RACH_notify message in response to the signal burst transmitted by the out-of-range secondary station, and wherein the out-of-range secondary station receives the RACH notify message from one of the secondary stations and determines timing of the RACH to use the RACH for a subsequent stage of registration with the LAN via the secondary station acting as the relay station.

* * * * *